(12) United States Patent
Tang et al.

(10) Patent No.: US 11,703,266 B2
(45) Date of Patent: Jul. 18, 2023

(54) COOLING SYSTEMS AND RELATED METHOD

(71) Applicant: General Electric Company, Schenectady, NY (US)

(72) Inventors: Ching-Jen Tang, Niskayuna, NY (US); Peter John Bonitatibus, Jr., Niskayuna, NY (US); John Brian McDermott, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/612,650

(22) PCT Filed: May 11, 2017

(86) PCT No.: PCT/US2017/032288
§ 371 (c)(1),
(2) Date: Nov. 11, 2019

(87) PCT Pub. No.: WO2018/208308
PCT Pub. Date: Nov. 15, 2018

(65) Prior Publication Data
US 2020/0208899 A1    Jul. 2, 2020

(51) Int. Cl.
*F25D 17/02*    (2006.01)
*C09K 5/20*    (2006.01)
(Continued)

(52) U.S. Cl.
CPC ............ *F25D 17/02* (2013.01); *C09K 5/20* (2013.01); *F25B 15/025* (2013.01); *F25B 47/006* (2013.01); *F25B 2500/09* (2013.01)

(58) Field of Classification Search
CPC ...... F25B 15/00; F25B 47/006; F25B 15/025; F25B 2500/09; F25B 15/06; F25B 29/006;
(Continued)

(56) References Cited

U.S. PATENT DOCUMENTS 2,794,322 A * 6/1957 Etherington ............ F25B 9/006
62/502
3,605,873 A * 9/1971 Leonard, Jr. .......... F25B 29/006
62/476
(Continued)

FOREIGN PATENT DOCUMENTS

ES    2403365 A2 * 5/2013
GB    811713 A    4/1959
(Continued)

OTHER PUBLICATIONS

International Search Report of the International Searching Authority for PCT/US2017/032288 dated Dec. 20, 2017.

*Primary Examiner* — Frantz F Jules
*Assistant Examiner* — Martha Tadesse
(74) *Attorney, Agent, or Firm* — Dority & Manning, P.A.

(57) ABSTRACT

A cooling system and a related method is presented. The cooling system includes a reservoir configured to selectively supply a cooling fluid; a circulation loop fluidly coupled to the reservoir, and configured to circulate the cooling fluid to and from the reservoir, and a heat exchanger thermally coupled to the circulation loop and configured to exchange heat with the cooling fluid. The reservoir includes a refrigerant and an anti-freeze additive. The anti-freeze additive is characterized by a lower critical solution temperature (LCST) such that when an operating temperature of the reservoir is greater than the LCST, the reservoir is configured to supply a cooling fluid including the refrigerant to the circulation loop; and when the operating temperature of the (Continued)

reservoir is lower than the LCST, the reservoir is configured to supply a cooling fluid including the refrigerant and the anti-freeze additive to the circulation loop.

15 Claims, 11 Drawing Sheets

(51) Int. Cl.
*F25B 15/02* (2006.01)
*F25B 47/00* (2006.01)

(58) Field of Classification Search
CPC ........... C09K 5/20; C09K 5/047; F25D 17/02; Y02B 30/62
See application file for complete search history.

(56) References Cited

U.S. PATENT DOCUMENTS

| | | |
|---|---|---|
| 4,138,855 A | 2/1979 | Jahan et al. |
| 7,264,649 B1 * | 9/2007 | Johnson .................... F24F 11/63 96/111 |
| 2009/0071181 A1 * | 3/2009 | Spanger ................. F24F 13/222 62/262 |
| 2010/0132384 A1 | 6/2010 | Shiflett et al. |
| 2014/0027668 A1 | 1/2014 | Poncelet et al. |
| 2017/0186662 A1 | 6/2017 | Ullmann et al. |
| 2018/0259229 A1 * | 9/2018 | Moghaddam ........... F25B 15/06 |

FOREIGN PATENT DOCUMENTS

| | | |
|---|---|---|
| WO | WO2008124087 A1 | 10/2008 |
| WO | WO2015173816 A1 | 11/2015 |
| WO | WO2017058747 A1 | 4/2017 |

* cited by examiner

COOLING SYSTEMS AND RELATED METHOD

BACKGROUND

Embodiments of the disclosure generally relate to cooling systems and related method. More particularly, embodiments of the disclosure relate to cooling systems including a refrigerant and an anti-freeze additive.

A variety of different types of components and machines can generate heat or thermal energy in operation. To prevent such components and machines from overheating, different types of cooling systems may be utilized to dissipate the thermal energy. Certain cooling systems utilize refrigerants (for example, water) as a coolant. To prevent the refrigerant from freezing during operation, the refrigerant may be mixed with an anti-freeze additive. Adding anti-freeze additives such as glycols to water can lower the freeze temperature of the aqueous solution below 0° C., preventing freezing damages. However, this addition may significantly reduce the thermal conductivity and specific heat of the solution. Thus, one or both of the size of the heat exchanger for the cooling system and the auxiliary power consumption for pumps may need to be increased to carry the same heat duty. Further, when an anti-freeze is added to the refrigerant in an evaporator for an absorption chiller, the addition reduces the saturated pressure of the refrigerant, resulting in less evaporation and thus, cooling capacity.

Therefore, there is a need for improved cooling systems and methods for controlling freezing of the refrigerants in the cooling systems.

BRIEF DESCRIPTION

In one aspect, the disclosure relates to a cooling system. The cooling system includes a reservoir configured to selectively supply a cooling fluid; a circulation loop fluidly coupled to the reservoir, and configured to circulate the cooling fluid to and from the reservoir; and a heat exchanger thermally coupled to the circulation loop and configured to exchange heat with the cooling fluid. The reservoir includes a refrigerant and an anti-freeze additive. The anti-freeze additive is characterized by a lower critical solution temperature (LCST) such that when an operating temperature of the reservoir is greater than the LCST, the reservoir is configured to supply a cooling fluid including the refrigerant to the circulation loop; and when the operating temperature of the reservoir is lower than the LCST, the reservoir is configured to supply a cooling fluid including the refrigerant and the anti-freeze additive to the circulation loop.

In another aspect, the disclosure relates to a method of cooling using a cooling system. The cooling system includes a reservoir, a circulation loop, and a heat exchanger, wherein the reservoir includes a refrigerant and an anti-freeze additive, the anti-freeze additive characterized by a lower critical solution temperature (LCST). The method includes selectively supplying a cooling fluid from the reservoir to the circulation loop, such that when an operating temperature of the reservoir is greater than the LCST, a cooling fluid including the refrigerant is supplied to the circulation loop. Further, when the operating temperature of the reservoir is lower than the LCST, a cooling fluid including the refrigerant and the anti-freeze additive is supplied to the circulation loop. The method further includes circulating the cooling fluid via the circulation loop from the reservoir to the heat exchanger, where the cooling fluid exchanges heat with the heat exchanger. The method furthermore includes circulating the cooling fluid from the heat exchanger to the reservoir via the circulation loop.

In yet another aspect, the disclosure relates to an absorption cycle apparatus. The absorption cycle apparatus includes an evaporator and an absorber in fluid communication with the evaporator. The evaporator includes a reservoir configured to selectively supply a cooling fluid; a circulation loop fluidly coupled to the reservoir, and configured to circulate the cooling fluid to and from the reservoir; and a heat exchanger thermally coupled to the circulation loop and configured to exchange heat with the cooling fluid. The reservoir includes a refrigerant and an anti-freeze additive. The anti-freeze additive is characterized by a lower critical solution temperature (LCST) such that when an operating temperature of the evaporator is greater than the LCST, the reservoir is configured to supply a cooling fluid including the refrigerant to the circulation loop; and when the operating temperature of the evaporator is lower than the LCST, the reservoir is configured to supply a cooling fluid including the refrigerant and the anti-freeze additive to the circulation loop.

These and other features, embodiments, and advantages of the present disclosure may be understood more readily by reference to the following detailed description.

DRAWINGS

These and other features, aspects, and advantages of the present disclosure will become better understood when the following detailed description is read with reference to the accompanying drawings, wherein.

DETAILED DESCRIPTION

In the following specification and the claims, which follow, reference will be made to a number of terms, which shall be defined to have the following meanings. The singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term. Here and throughout the specification and claims, range limitations may be combined and/or interchanged, such ranges are identified and include all the sub-ranges contained therein unless context or language indicates otherwise.

Embodiments of the present disclosure relate to a cooling system. The cooling system includes a reservoir configured to selectively supply a cooling fluid; a circulation loop fluidly coupled to the reservoir, and configured to circulate the cooling fluid to and from the reservoir; and a heat exchanger thermally coupled to the circulation loop and configured to exchange heat with the cooling fluid. The reservoir includes a refrigerant and an anti-freeze additive. The anti-freeze additive is characterized by a lower critical solution temperature (LCST) such that when an operating temperature of the reservoir is greater than the LCST, the reservoir is configured to supply a cooling fluid including the refrigerant to the circulation loop; and when the operating temperature of the reservoir is lower than the LCST, the reservoir is configured to supply a cooling fluid including the refrigerant and the anti-freeze additive to the circulation loop.

Figure 1A:
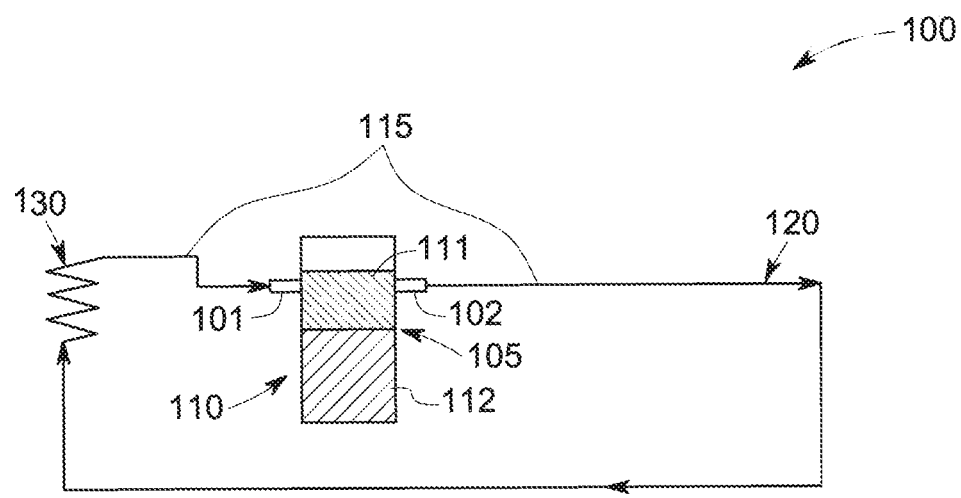
FIG. 1A illustrates a cooling system configuration when the operating temperature is greater than the LCST, in accordance with some embodiments of the disclosure.
Figure 1B:
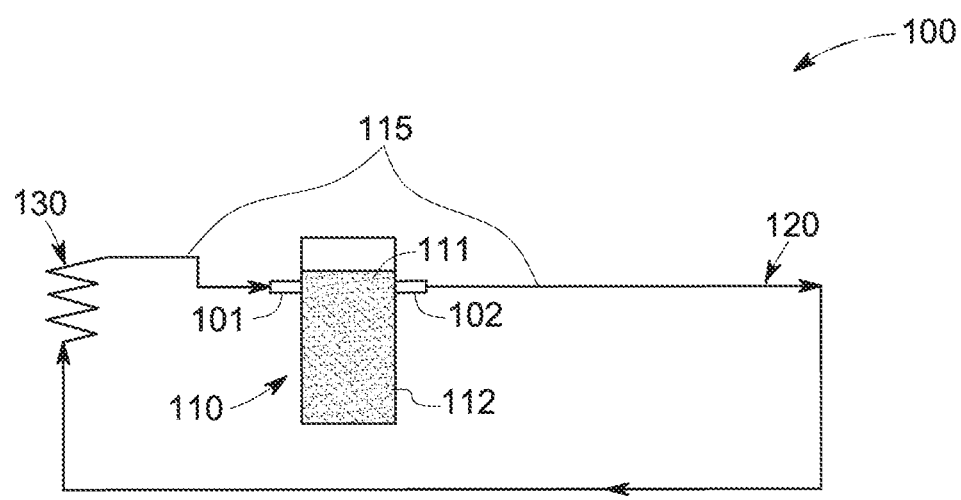
FIG. 1B illustrates a cooling system configuration when the operating temperature is lower than the LCST, in accordance with some embodiments of the disclosure.

FIGS. 1A and 1B illustrate a cooling system 100 in accordance with some embodiments of the disclosure. The cooling system 100 includes a reservoir 110, a circulation loop 120, and a heat exchanger 130. As illustrated in FIGS. 1A and 1B, the circulation loop 120 is fluidly coupled to the reservoir 110, and is configured to circulate a cooling fluid 115 to and from the reservoir 110. The term "fluidly coupled" as used herein means that the circulation loop 120 is in fluid communication (directly or indirectly) with the reservoir 110, such that the circulation loop 120 can receive a fluid from the reservoir 110 and deliver the fluid into the reservoir 110. In some embodiments, the circulation loop 120 is directly coupled to an outlet of the reservoir 110.

In the embodiments illustrated in FIGS. 1A and 1B, the circulation loop 120 is configured to circulate the cooling fluid 115 into the reservoir 110 via an inlet 101, and to circulate the cooling fluid 115 from the reservoir 110 via a first outlet 102. As described in detail later, the configuration, the location, and the number of the inlets and outlets in the reservoir 110 may vary depending on the configuration of the reservoir 110.

As mentioned earlier, the reservoir 110 further includes a refrigerant 111 and an anti-freeze additive 112. The term "refrigerant" as used herein refers to a fluid or a mixture of fluids, that is capable of functioning as a heat transfer fluid by absorbing heat from a working fluid, thereby providing a cooling effect. In some embodiments, the refrigerant includes water. In some embodiments, the refrigerant includes a mixture of water and other suitable refrigerant fluids. Non-limiting examples of other suitable refrigerant fluids include alcohols.

As discussed earlier, during operation of a cooling system, if the refrigerant is exposed to temperatures that are lower than the freeze temperature of the refrigerant, the refrigerant may freeze, thereby resulting in operational difficulties. For examples, in embodiments where the refrigerant includes water, the minimum operating temperature of the reservoir may be limited by the freeze temperature of water (such as 0° C.). To mitigate the limitations posed by the freeze temperatures of the refrigerant, the reservoir may further include an anti-freeze additive. The term "anti-freeze additive" as used herein refers to a composition, which when added to the refrigerant in a sufficient amount lowers the freeze temperature of the refrigerant, such that the refrigerant does not substantially freeze during operation of the cooling system. According to embodiments of the disclosure, the anti-freeze additive is further characterized by a lower critical solution temperature (LCST). The term "LCST" as used herein refers to the temperature above which the anti-freeze additive becomes substantially immiscible with the refrigerant and phase separates. Similarly, the anti-freeze additive is substantially miscible with the refrigerant at a temperature below the LCST, thereby forming a substantially single phase.

In some embodiments, the anti-freeze additive is capable of undergoing a reversible phase change, thereby separating from the refrigerant when the operating temperature is greater than the LCST. Therefore, the anti-freeze additive may be selected based, at least in part, on the operating temperature of the reservoir, and accordingly the LCST desired for the anti-freeze additive. The term "operating temperature" as used in this context refers to the average temperature that the fluid in the reservoir is exposed to during operation of the cooling system. Further, the terms "operating" and "operation" as used herein encompass both the idle stages as well as the cooling stages of the cooling system. Furthermore, the operating temperature of the reservoir depends on the desired application of the cooling system. For example, the operating temperature of a reservoir in a cooling system employed for cooling turbine inlet air may be different from the operating temperature of a reservoir in a cooling system employed for providing air-conditioning to a residential or commercial building.

The operating temperature of the reservoir, in some embodiments, is in a range from about −50° C. to about 100° C. In some embodiments, the operating temperature is in a range from about 5° C. to about 90° C. In some embodiments, the operating temperature is in a range from about 5° C. to about 60° C. In some embodiments, the operating temperature is the ambient temperature that the cooling system is exposed to during operation of the cooling system.

According to embodiments of the disclosure, the anti-freeze additive is selected such that the anti-freeze additive has the required LCST for a given application of the cooling system and the refrigerant composition. In some embodiments, the anti-freeze additive is selected such that the anti-freeze additive exhibits the behavior of the LCST when mixed with water. In some embodiments, the LCST of the anti-freeze additive is in a range from about 1° C. to about 90° C. In some embodiments, the LCST of the anti-freeze additive is in a range from about 10° C. to about 70° C. In some embodiments, the LCST of the anti-freeze additive is in a range from about 10° C. to about 20° C.

The anti-freeze additive is further selected such that there is a sufficient difference in density between the refrigerant and the anti-freeze additive. The density difference between the refrigerant and the anti-freeze additive allows the refrigerant and the anti-freeze additive to form substantially distinct layers in the reservoir, when the refrigerant and the anti-freeze additive phase-separate. In some embodiments, the anti-freeze additive and the refrigerant have a density difference that is greater than 30 kg/m$^3$. In some embodiments, the anti-freeze additive and the refrigerant have a density difference that is greater than 100 kg/m$^3$. In some embodiments, the anti-freeze additive and the refrigerant have a density difference in a range from about 30 kg/m$^3$ to about 1000 kg/m$^3$. The term "density difference" as used herein refers to the absolute value of the difference in densities between the anti-freeze additive and the refrigerant. For example, in embodiments wherein the anti-freeze additive is lighter than the refrigerant, the mathematical difference between the density of the anti-freeze additive and the density of the refrigerant would result in a negative number. However, in such instances, the term "density difference" as referred to herein would be the absolute value of the mathematical difference between the two densities.

Further, as will be appreciated by one of ordinary skill in the art, the density of the refrigerant and the anti-freeze additive may vary depending on the temperature and the pressure. Accordingly, the term "density difference" as used herein refers to a difference in densities of the refrigerant and the anti-freeze additive, determined at the same temperature and pressure values. In some embodiments, the density difference is determined at the operating temperature and pressure of the reservoir.

In some embodiments, the anti-freeze additive includes amines, polyalkylene glycols, polyamines, ionic liquids, or combinations thereof. Non-limiting examples of suitable polyether glycols include polyethylene glycol, polypropylene glycol, or combinations thereof. Non-limiting examples of suitable ionic liquids include [P4448][Tf-Leu], as described in "Thermoresponsive polyelectrolytes derived from ionic liquids", Polym. Chem., 2015, 6, 2163.

The amount of anti-freeze additive in the reservoir may depend at least in part on one or more of the refrigerant composition, the thermal conductivity of the refrigerant, the freezing point depression desired, the operating temperature of the reservoir, and the end-use application of the cooling system. In some embodiments, the anti-freeze additive is present in the reservoir in an amount in a range from about 5 weight percent to about 60 weight percent. In some embodiments, the anti-freeze additive is present in the reservoir in an amount in a range from about 5 weight percent to about 30 weight percent.

In some embodiments, the reservoir may further include additional additives. The choice of the additional additive may depend on one or more of the refrigerant composition, the anti-freeze additive composition, and the application of the cooling system. Non-limiting examples of suitable additional additives include antifoaming agents, colorants, biocides, buffering agents, corrosion inhibitors, or combinations thereof. The additional additives may be included in the reservoir in an amount such that the performance properties of the cooling fluid are not substantially affected.

Referring again to FIGS. 1A and 1B, as mentioned previously, in accordance with embodiments of the disclosure, when the operating temperature of the reservoir 100 is lower than the LCST, the refrigerant 111 and the anti-freeze additive 112 are present in the reservoir 110 as a substantially miscible phase. Similarly, when the operating temperature of the reservoir 110 is greater than the LCST, the refrigerant 111 and the anti-freeze additive 112 are present in the reservoir as substantially immiscible phases.

FIG. 1A illustrates an embodiment wherein the operating temperature of the reservoir 110 is greater than the LCST of the anti-freeze additive 112. As illustrated in FIG. 1A, when the operating temperature is greater than the LCST, the refrigerant 111 and the anti-freeze additive 112 in the reservoir become immiscible, and are separated into two separate layers due to the density difference between the refrigerant and the anti-freeze additive. In some embodiments, as illustrated in FIG. 1A, the refrigerant 111 and the anti-freeze additive 112 may separate and form an interface line 105. In such instances, when the operating temperature is greater than the LCST, the refrigerant enters and leaves the reservoir 110 from the inlet 101 and outlet 102, located above the interface line between the refrigerant 111 and the anti-freeze additive 112. Therefore, the anti-freeze additive 112 may not be substantially entrained by the refrigerant 111 flow, and substantially pure refrigerant may be discharged from the outlet 102. Accordingly, the cooling fluid 115 discharged from the reservoir 110, as illustrated in FIG. 1A, includes the refrigerant primarily. Therefore, in such embodiments, the reservoir 110 is configured to supply the cooling fluid 115 including the refrigerant to the circulation loop 120.

In accordance with some embodiments of the disclosure, there may be a small amount of anti-freeze additive entrained in the refrigerant flow when the operating temperature is greater than the LCST. However, the amount of anti-freeze additive may be sufficiently small such that the thermal conductivity of the refrigerant is not significantly altered. In some embodiments, when the operating temperature of the reservoir is greater than the LCST, the cooling fluid includes less than 5 weight percent of the anti-freeze additive. In some embodiments, when the operating temperature of the reservoir is greater than the LCST, the cooling fluid includes less than 2 weight percent of the anti-freeze additive. In some embodiments, when the operating temperature of the reservoir is greater than the LCST, the cooling fluid includes less than 1 weight percent of the anti-freeze additive.

With continued reference to FIG. 1A, the cooling fluid 115 is circulated by the circulation loop 120 to the heat exchanger 130 where it may exchange heat, thereby providing cooling for the desired application, as described in detail later. The heated cooling fluid 115 is then circulated back to the reservoir 110, thereby completing the cycle. In the embodiment illustrated in FIG. 1A, as the operating temperature is greater than the LCST during the entire operation of the cooling system 100, the refrigerant 111 and the anti-freeze additive 112 remain substantially immiscible.

FIG. 1B illustrates an embodiment wherein the operating temperature of the reservoir 110 is lower than the LCST of the anti-freeze additive 112. As illustrated in FIG. 1B, when the operating temperature is lower than the LCST, the refrigerant 111 and the anti-freeze additive 112 in the reservoir become miscible, and form a substantially homogeneous mixture. Accordingly, the cooling fluid 115 discharged from the reservoir 110, as illustrated in FIG. 1B, includes the refrigerant and the anti-freeze additive. Therefore, in such embodiments, the reservoir 110 is configured to supply a cooling fluid 115 including the refrigerant and the anti-freeze additive to the circulation loop 120.

As mentioned previously, the amount of anti-freeze additive 112 in the reservoir 110 is predetermined such that the desired shift of the freezing point of the refrigerant 111 can be achieved to avoid freezing damages. In accordance with embodiments of the disclosure, the amount of anti-freeze additive entrained in the refrigerant flow when the operating temperature is lower than the LCST may be such that the desired shift of the freezing point is achieved. In some embodiments, when the operating temperature of the reservoir is lower than the LCST, the cooling fluid includes the anti-freeze additive in an amount in a range from about 5 weight percent to about 60 weight percent. In some embodiments, when the operating temperature of the reservoir is lower than the LCST, the cooling fluid includes the anti-freeze additive in an amount in a range from about 5 weight percent to about 30 weight percent.

With continued reference to FIG. 1B, the cooling fluid 115 (including the refrigerant and the anti-freeze additive) is circulated by the circulation loop 120 to the heat exchanger 130 where it may exchange heat, thereby providing cooling for the desired application, as described in detail later. The heated cooling fluid 115 is then circulated back to the reservoir 110, thereby completing the cycle. In the embodiments illustrated in FIG. 1B, as the operating temperature is lower than the LCST during the operation of the cooling system 100, the refrigerant 111 and the anti-freeze additive 112 remain substantially miscible.

In some embodiments, a density of the anti-freeze additive is greater than a density of the refrigerant, and the reservoir is configured to supply the cooling fluid to the circulation loop via an outlet located proximate to a top end of the reservoir. In the embodiments illustrated in FIGS. 1A and 1B, the anti-freeze additive 112 is heavier than the refrigerant (e.g., water) 111, that is density of the anti-freeze additive 112 is greater than density of the refrigerant 111. Therefore, as illustrated in FIG. 1A, the anti-freeze additive 112 settles as a layer in the lower portion of the reservoir 110, when the operating temperature of the reservoir 110 is greater than the LCST. In such instances, an output 102 for circulating the cooling fluid 115 from the reservoir 110 is located proximate to a top-end of the reservoir 110.

The present disclosure also encompasses embodiments, wherein the density of the anti-freeze additive 112 is lower than a density of the refrigerant 11, and the reservoir 110 is configured to supply the cooling fluid 115 to the circulation loop 120 via an outlet (not shown in Figures) located proximate to a bottom end of the reservoir 110. Therefore, in such instances, the refrigerant 111 settles as a layer in the lower portion of the reservoir 110, when the operating temperature of the reservoir 110 is greater than the LCST. In such instances, the output 102 for circulating the cooling fluid 115 from the reservoir 110 is located proximate to a bottom-end of the reservoir 110.

As mentioned earlier, conventional cooling systems may be limited by the freeze temperature of the refrigerant employed. Adding anti-freeze additives such as glycols to water for a cooling system can lower the freeze temperature of the aqueous solution below 0° C., preventing freezing damages. However, this addition may reduce the thermal conductivity and specific heat of the cooling fluid.

Embodiments of the present disclosure address the noted shortcomings in the art. Embodiments of the present disclosure advantageously relate to a cooling system that automatically releases an anti-freeze additive along with a refrigerant, as and when required. When the operating temperature goes below a preset value, which may result in freezing damages, the cooling system automatically releases the anti-freeze additive from the reservoir into the cooling loop. When the operating temperature is above the preset value, the anti-freeze additive leaves the cooling loop and comes back to the reservoir, and a substantially pure refrigerant flow (e.g., water) is circulated as the cooling fluid for the cooling loop. The release of the anti-freeze additive is governed by the properties of the refrigerant and anti-freeze additive phase separation at the LCST. The cooling systems described herein may therefore mitigate the operational challenges faced by cooling systems when the operating temperature is lower than the freeze temperature of the refrigerant. Further, the cooling system described herein may also mitigate the thermal conductivity challenges faced by cooling systems employing a mixture of refrigerant and anti-freeze additive (e.g., glycols) as the cooling fluid.

Figure 2A:
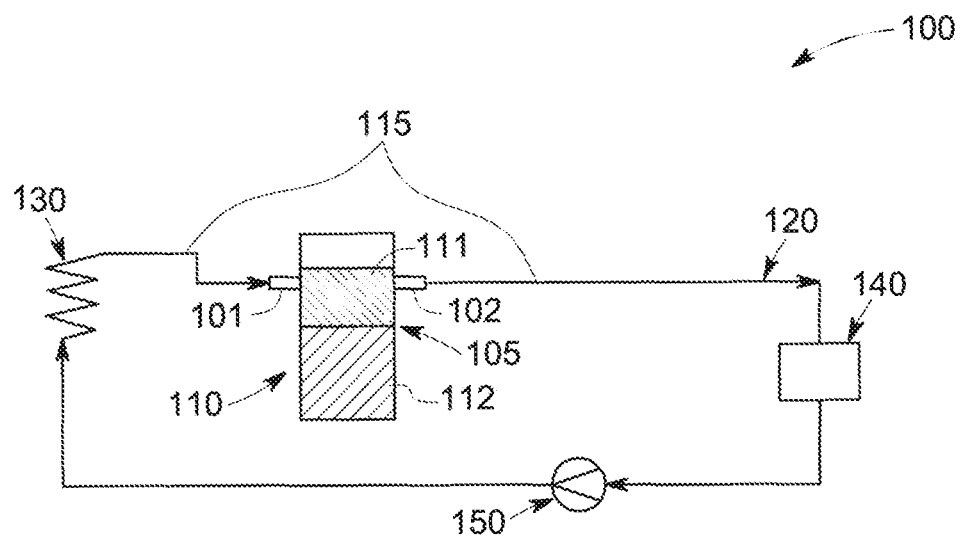
FIG. 2A illustrates a cooling system configuration when the operating temperature is greater than the LCST, in accordance with some embodiments of the disclosure.
Figure 2B:
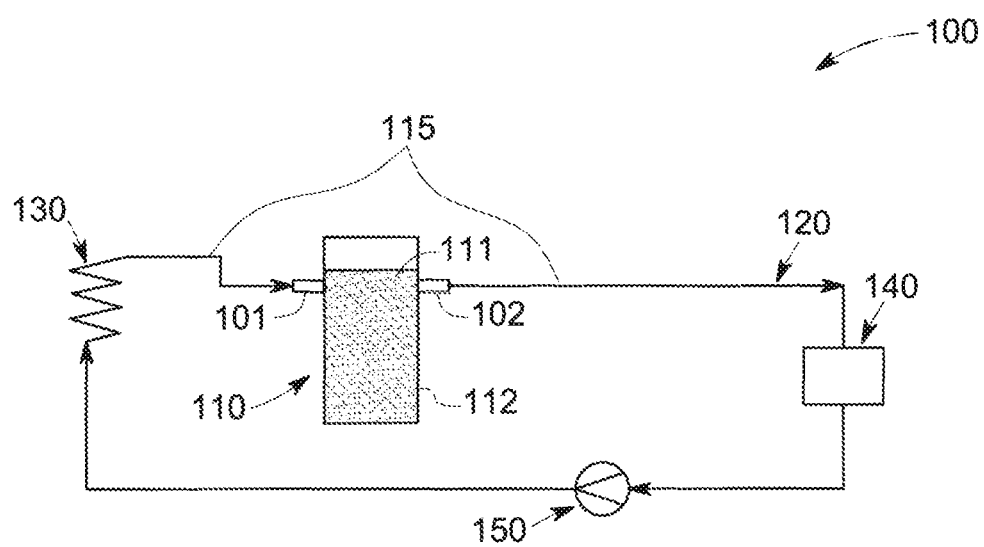
FIG. 2B illustrates a cooling system configuration when the operating temperature is lower than the LCST, in accordance with some embodiments of the disclosure.

Referring now to FIGS. 2A and 2B, the cooling system 100 may further include a heat rejection device 140 thermally coupled to the circulation loop 120. The heat rejection device 140 may be configured to cool the cooling fluid 115 before the cooling fluid 115 exchanges heat with the heat exchanger 130. As illustrated in FIGS. 2A and 2B, the heat rejection device 140 receives the cooling 115 fluid supplied from the reservoir 110 via the outlet 102, and circulated to the heat rejection device 140 via the circulation loop 120. In some embodiments, the heat rejection device 140 may include any suitable heat sink for the desired application, for example, a chiller. Non-limiting examples of suitable heat rejection devices include a radiator, a dry cooling tower, or a wet cooling tower.

With continued reference to FIGS. 2A and 2B, the cooled cooling fluid 115 is further circulated via the circulation loop 120 to the heat exchanger 130, where it provides the desired cooling. In some embodiments, as shown in FIGS. 2A and 2B, the cooling system 100 may further include a pump 150 for pressurizing and circulating the cooling fluid 115 in the circulation loop. Suitable examples of the heat exchanger 130 and the heat rejection device 140 are described in detail later.

Further, similar to the embodiment illustrated in FIG. 1A, FIG. 2A illustrates an embodiment wherein the operating temperature of the reservoir 110 is greater than the LCST. Therefore, the cooling fluid 115 circulated to the heat rejection device 140 and the heat exchanger 130, via the circulation loop 120, includes the refrigerant primarily. In such instances, temperature of the cooling fluid released from the heat rejection device 140 is controlled such that this temperature is higher than the freeze temperature of the refrigerant. FIG. 2B illustrates an embodiment wherein the operating temperature of the reservoir 110 is lower than the LCST. Therefore, the cooling fluid 115 circulated to the heat rejection device 140 and the heat exchanger 130, via the circulation loop 120, includes the refrigerant and the anti-freeze additive. In such instances, the anti-freeze additive is present in the cooling fluid in a sufficient amount such that the freeze temperature of the refrigerant is depressed to a value lower than the temperature of the cooled cooling fluid.

Figure 2C:
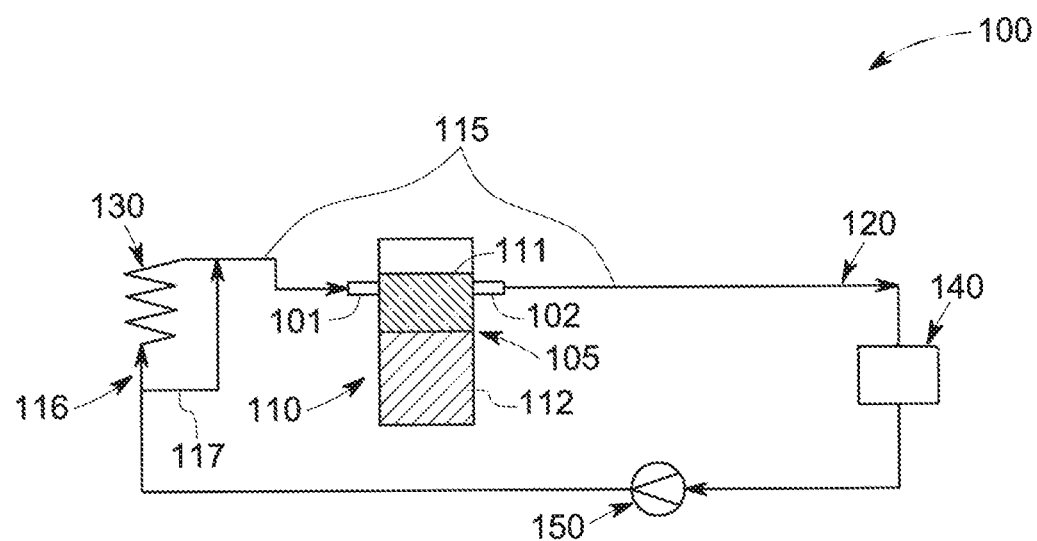
FIG. 2C illustrates a cooling system configuration when the operating temperature is greater than the LCST, in accordance with some embodiments of the disclosure.
Figure 2D:
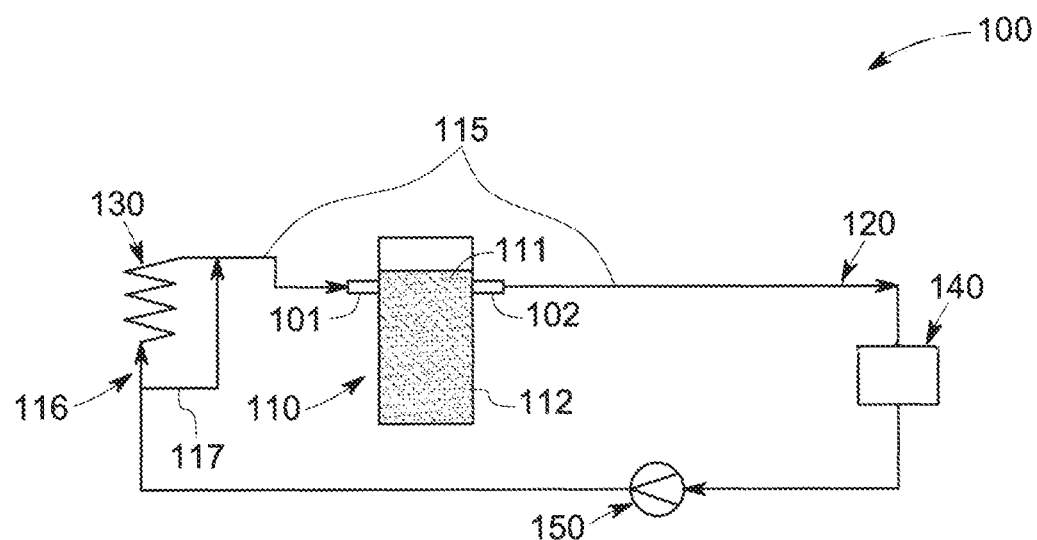
FIG. 2D illustrates a cooling system configuration when the operating temperature is lower than the LCST, in accordance with some embodiments of the disclosure.

In certain embodiments, as shows in FIGS. 1A, 1B, 2A and 2B, the reservoir 110 is located directly downstream of the heat exchanger 130, and therefore configured to receive the heated cooling fluid 115 directly from the heat exchanger 130. This may allow control over the temperature of the fluid in the reservoir 110. In some embodiments, an operating temperature of the reservoir 110 may be further controlled by bypassing a portion of the cooling fluid 115 via the heat exchanger 130 and directing this portion of the cooling fluid into the reservoir directly. For example, FIGS. 2C and 2D illustrate such embodiments wherein a portion of the cooling fluid 116 is directed into the heat exchanger while the remaining portion 117 is directed into the reservoir 110. Therefore, the temperature of the cooling fluid 115 being supplied to the reservoir 110 can be controlled.

Figure 3A:
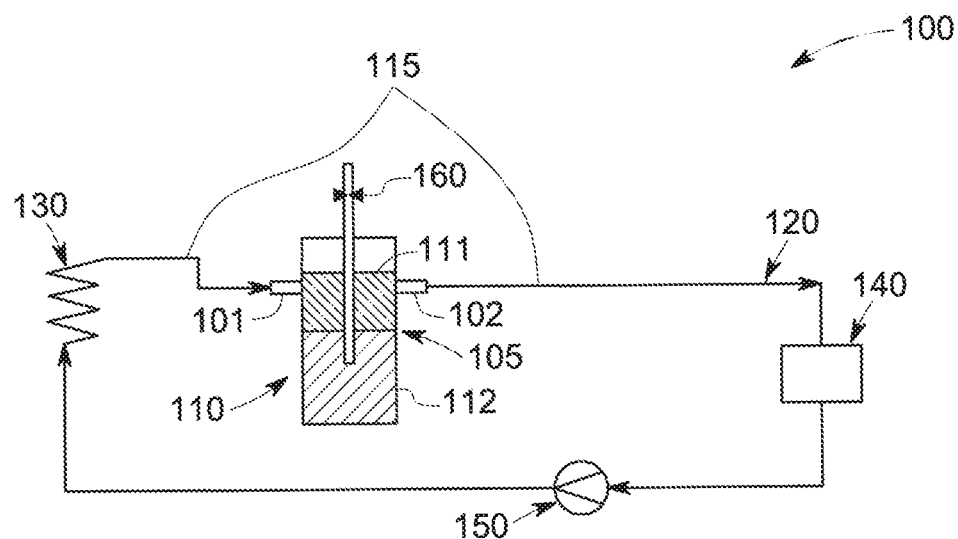
FIG. 3A illustrates a cooling system configuration when the operating temperature is greater than the LCST, in accordance with some embodiments of the disclosure.
Figure 3B:
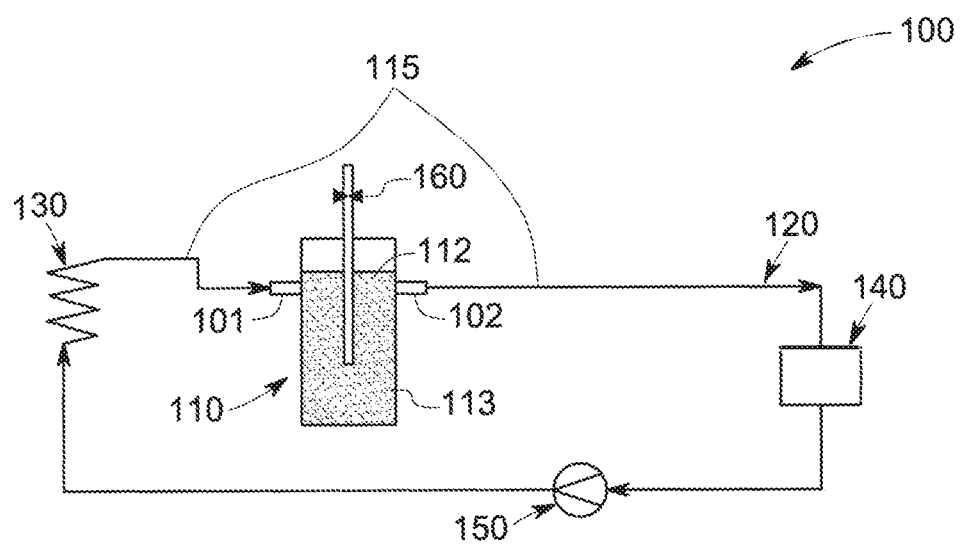
FIG. 3B illustrates a cooling system configuration when the operating temperature is lower than the LCST, in accordance with some embodiments of the disclosure.

FIGS. 3A, 3B, 4A, 4B, 5A, and 5B illustrate alternate configurations for the reservoir 110 in the cooling system 100, in accordance with some embodiments of the disclosure. FIGS. 3A and 3B illustrate the cooling system configurations similar to 2A and 2B, respectively, with the addition of an agitating component 160 in the reservoir 110. The agitating component 160 may be provided in the reservoir 110 for mixing the refrigerant 111 and the anti-freeze additive 112, and to provide the substantially miscible phase. The agitating component 160 may be controlled such that it is in an off state when the operating temperature is greater than the LCST (FIG. 3A), and the refrigerant 111 and the anti-freeze additive 112 phase separate in the reservoir 110. Therefore, the cooling fluid 115 discharged from the reservoir 110 includes the refrigerant primarily.

When the operating temperature is lower than the LCST (FIG. 3B), the agitating component 160 may be turned on to effect more homogeneous mixing of the refrigerant 111 with the anti-freeze additive 112 in the reservoir 110. Therefore, the cooling fluid 115 discharged from the reservoir 110 includes a substantially homogeneous mixture of the refrigerant and the anti-freeze additive. Any suitable configuration of the agitating component 160 may be employed in the reservoir, and the configurations illustrated in FIGS. 3A and 3B are for illustration purposes only.

Figure 4A:
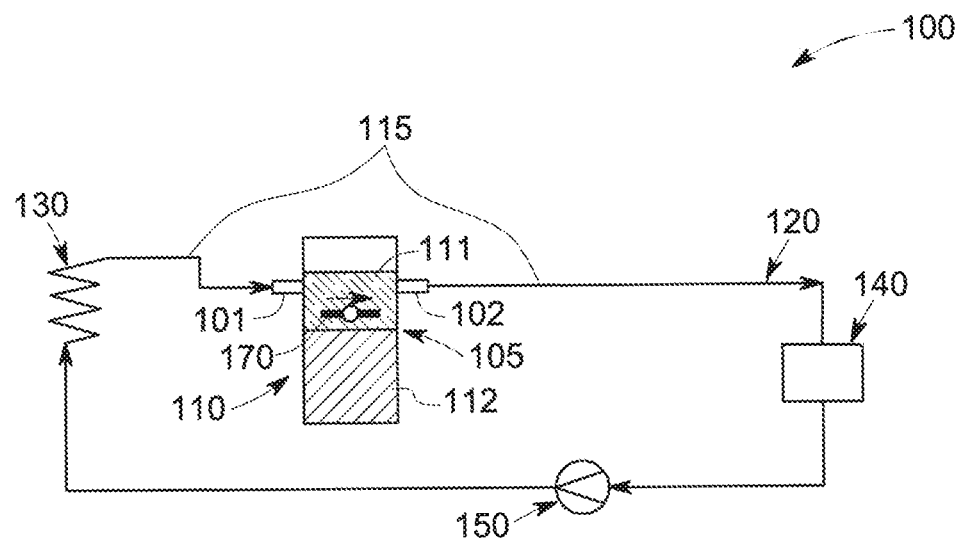
FIG. 4A illustrates a cooling system configuration when the operating temperature is greater than the LCST, in accordance with some embodiments of the disclosure.
Figure 4B:
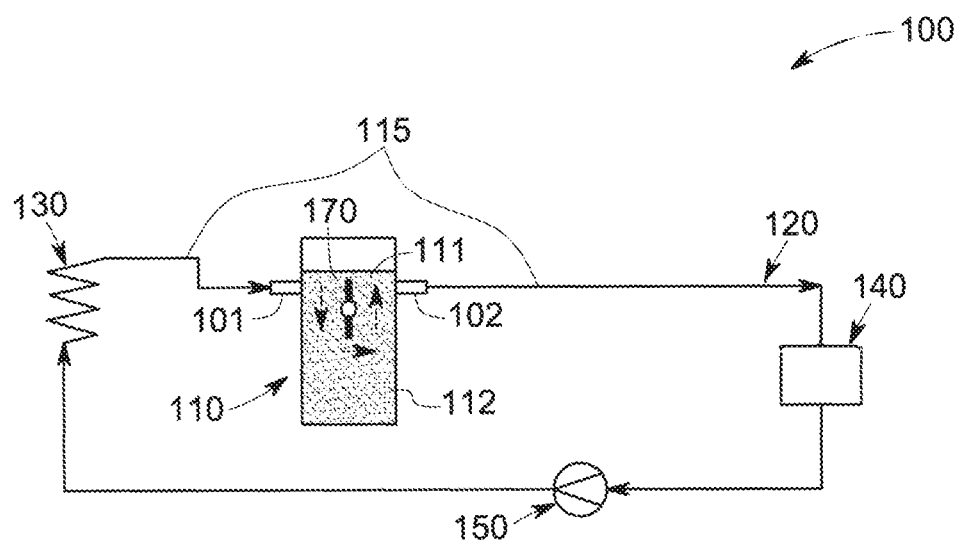
FIG. 4B illustrates a cooling system configuration when the operating temperature is lower than the LCST, in accordance with some embodiments of the disclosure.

FIGS. 4A and 4B illustrate the cooling system configurations similar to 2A and 2B, respectively, with the addition of a valve 170 in the reservoir 110. The valve 170 may be provided in the reservoir 110 for directing and controlling the flow of one or both of the refrigerant 111 and the anti-freeze additive 112 in the reservoir 110. The valve 170 may be controlled such that it is in an off state when the operating temperature is greater than the LCST (FIG. 4A), and the refrigerant 111 and the anti-freeze additive 112 phase separate in the reservoir 110. In such instances, as illustrated in FIG. 4A, the refrigerant 111 flow is directed and controlled to and from the reservoir 110, such that the flow (shown by dashed arrows) occurs above the interface line 105. Therefore, the cooling fluid 115 discharged from the reservoir 110 includes the refrigerant primarily.

When the operating temperature is lower than the LCST (FIG. 4B), the valve 170 may be turned on to effect more homogeneous mixing of the refrigerant 111 with the anti-freeze additive 112 in the reservoir 110. As illustrated in FIG. 4B, in such instances, the refrigerant 111 flow (shown by dashed arrows) may be directed downward towards the bottom-end of the reservoir and then upwards towards the top-end of the reservoir, where the outlet 102 is located. Therefore, the cooling fluid 115 discharged from the reservoir 110 includes a substantially homogeneous mixture of the refrigerant and the anti-freeze additive. Any suitable configuration of the valve 170 may be employed in the reservoir, and the configurations illustrated in FIGS. 4A and 4B are for illustration purposes only.

Figure 5A:
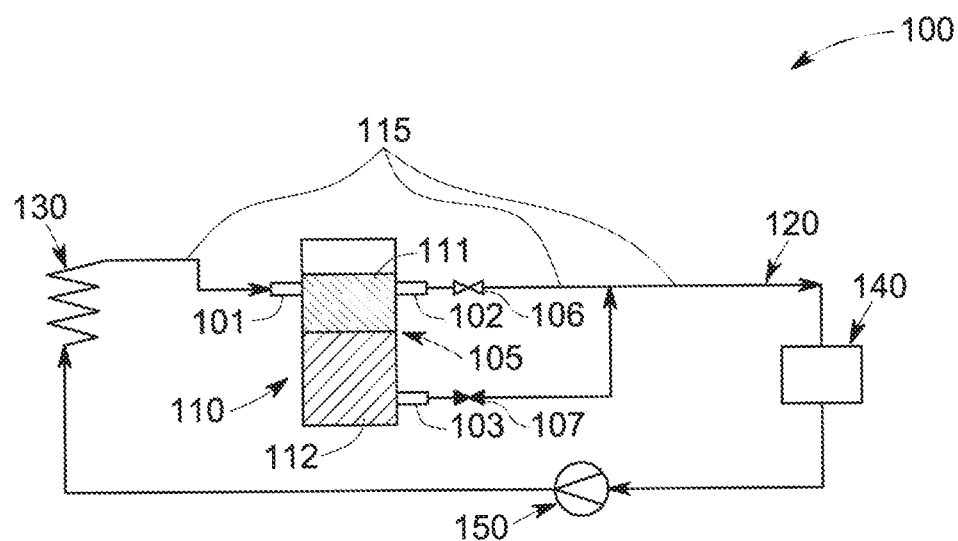
FIG. 5A illustrates a cooling system configuration when the operating temperature is greater than the LCST, in accordance with some embodiments of the disclosure.
Figure 5B:
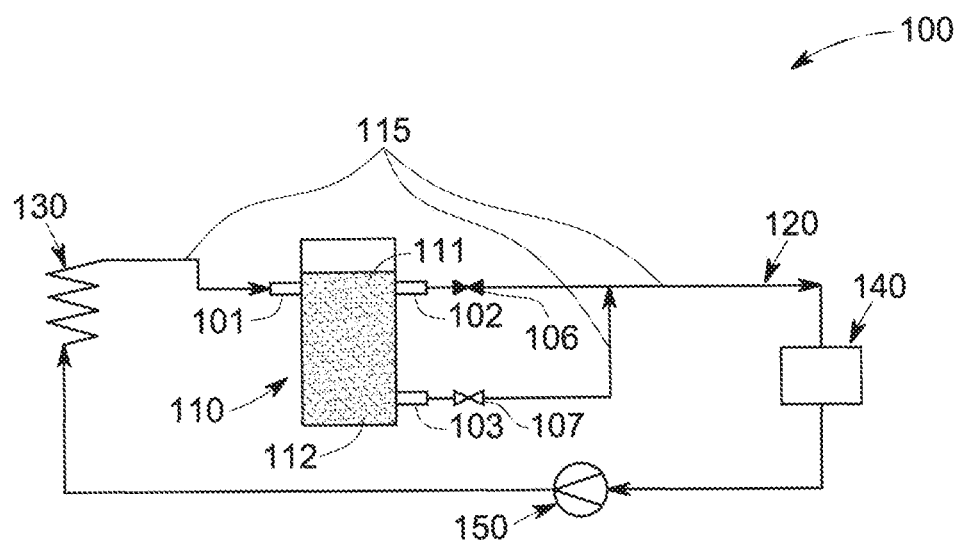
FIG. 5B illustrates a cooling system configuration when the operating temperature is lower than the LCST, in accordance with some embodiments of the disclosure.

FIGS. 5A and 5B illustrate the cooling system configurations similar to 2A and 2B, respectively, with the addition of a second outlet 103 in the reservoir 110, in addition to the first outlet 102. The first outlet 102 and the second outlet 103 are further fluidly coupled to the circulation loop 120 via the first outlet valve 106 and the second outlet valve 107, respectively. The two outlets 102,103 and the two outlet valves 106,107 may be provided in the reservoir 110 for directing and controlling the flow of one or both of the refrigerant 111 and the anti-freeze additive 112 from the reservoir 110. The outlet valves 106, 107 may be controlled such that one of them is in an on state and the other is in an off state depending on the operating temperature of the reservoir 110. For example, in the embodiments illustrated in FIG. 5A, when the operating temperature is greater than the LCST, the outlet valve 106 is in an on state and the outlet valve 107 is in an off state. In such instances, as illustrated in FIG. 5A, the refrigerant 111 flow is directed and controlled to and from the reservoir 110, such that the flow occurs above the interface line 105 via the first outlet 102. Therefore, the cooling fluid 115 discharged from the reservoir 110 includes the refrigerant primarily.

When the operating temperature is lower than the LCST (FIG. 5B), the outlet valve 106 may be turned off and the outlet valve 107 may be turned on to effect more homogeneous mixing of the refrigerant 111 with the anti-freeze additive 112 in the reservoir 110. As illustrated in FIG. 5B, in such instances, the refrigerant 111 flow may be directed downward towards the bottom-end of the reservoir and the cooling fluid 115 may be discharged from the reservoir 110 via the second outlet 103 located proximate to a bottom-end of the reservoir. Therefore, the cooling fluid 115 discharged from the reservoir 110 includes a substantially homogeneous mixture of the refrigerant and the anti-freeze additive. Any suitable configuration of the outlet valves 106, 107 may be employed in the reservoir, and the configurations illustrated in FIGS. 5A and 5B are for illustration purposes only.

It should be noted that the embodiments illustrated in FIGS. 3A, 3B, 4A, 4B, 5A, and 5B correspond to reservoir configurations in which the anti-freeze additive is heavier than the refrigerant, and settles towards the bottom of the reservoir upon phase separation. As mentioned previously, present disclosure also encompasses embodiments wherein the anti-freeze additive 112 is lighter than the refrigerant 111. The location of the outlets 102,103 and the operation of the valves 106, 107 and 170 may be accordingly modified in such embodiments such that the principle of operation of the cooling system is maintained. Furthermore, two or more configurations as illustrated in FIGS. 3A, 3B, 4A, 4B, 5A, and 5B may be combined to provide the desired reservoir configuration. For example, in some embodiments, the reservoir 110 may include a combination of the agitating component 160 and the outlet valves 106, 107. In some other embodiments, the reservoir 110 may include a combination of the valve 170 and the outlet valves 106, 107, for example.

A method of cooling using a cooling system is also presented. In accordance with some embodiments of the disclosure, the method may be described by referring to FIGS. 1A and 1B. The cooling system 100 includes a reservoir 110, a circulation loop 120, and a heat exchanger 130, wherein the reservoir 110 includes a refrigerant 111 and an anti-freeze additive 112. The anti-freeze additive is characterized by a lower critical solution temperature (LCST). As illustrated in the figures, when the operating temperature of the reservoir 110 is lower than the LCST, the refrigerant 111 and the anti-freeze additive 112 are present in the reservoir 110 as a substantially miscible phase (FIG. 1B). Further, when the operating temperature of the reservoir 110 is greater than the LCST, the refrigerant 111 and the anti-freeze additive 112 are present in the reservoir as substantially immiscible phases (FIG. 1A).

The method includes selectively supplying a cooling fluid 115 from the reservoir 110 to the circulation loop 120, such that when an operating temperature of the reservoir 110 is greater than the LCST (FIG. 1A), a cooling fluid 115 including the refrigerant 111 is supplied to the circulation loop 120 (FIG. 1A). Further, when the operating temperature of the reservoir 110 is lower than the LCST (FIG. 1B), a cooling fluid 115 including the refrigerant 111 and the anti-freeze additive 112 is supplied to the circulation loop 120.

The method further includes circulating the cooling fluid 115 via the circulation loop 120 from the reservoir to the heat exchanger 130, where the cooling fluid 115 exchanges heat with the heat exchanger 130, as shown in FIGS. 1A and 1B. The method furthermore includes circulating the cooling fluid 115 from the heat exchanger 130 to the reservoir 110 via the circulation loop 120.

In some embodiments, the method may further include circulating the cooling fluid from the reservoir 110 to a heat rejection device 140 prior to the heat exchange step (FIGS. 2A and 2B) in the heat exchanger 130. In some embodiments, the cooling fluid 115 may be further subjected to a pressurizing step in a pump 150, after the step of heat rejection and prior to the step of heat exchange in the heat exchanger 130 (FIGS. 2A and 2B).

It should be noted, that the method of cooling, as described earlier, is in the context of reservoir configuration as illustrated in FIGS. 1A and 1B. However, methods of cooling using alternate configurations of the reservoir 110, as illustrated in FIGS. 3A, 3B, 4A, 4B, 5A, and 5B, are also envisaged within the scope of the present disclosure. For example, in some embodiments, the method may further include agitating the refrigerant 111 and the anti-freeze additive 112 using an agitator 160 in the reservoir 110, to provide the substantially miscible phase, when the operating temperature is lower than the LCST (FIG. 3B). In the embodiments illustrated in FIGS. 4A and 4B, the method may further include using a valve 170 in the reservoir 110, for directing and controlling the flow of one or both of the refrigerant 111 and the anti-freeze additive 112 in the reservoir 110.

In some embodiments, the method includes supplying the cooling fluid 115 from the reservoir 110 to the circulation loop 120 via an outlet 102 located proximate to a top end of the reservoir 110. In some other embodiments, the method includes supplying the cooling fluid 115 from the reservoir 110 to the circulation loop 120 via an outlet located proximate to a bottom end of the reservoir 110. The location of the outlet for supplying the cooling fluid 115 to the circulation loop may depend at least in part on the density of the refrigerant vis-à-vis the anti-freeze additive.

For example, in some embodiments, a density of the anti-freeze additive 112 is greater than a density of the refrigerant 111, and the method may include supplying the cooling fluid to the circulation loop via an outlet located proximate to a top end of the reservoir (as shown in FIGS. 1A and 1B). In some other embodiments, the density of the anti-freeze additive 112 is lower than a density of the refrigerant 111, and the method may include supplying the cooling fluid to the circulation loop via an outlet located proximate to a bottom end of the reservoir 110 (not shown in Figures). Further, as illustrated in FIGS. 5A and 5B, the location of the outlet 102,103 for supplying the cooling fluid 115 to the circulation loop 120 may also be varied by controlling the fluid flow from the reservoir 110 using valves 106,107.

The cooling systems and related methods as disclosed herein may have a wide range of cooling applications, including, but not limited to refrigeration, air conditioning, industrial cooling, absorption chillers, and the like In some embodiments, a cooling system describe herein may be deployed for use in, or fabricated or operated as, a refrigerator, a freezer, an ice machine, an air conditioner, or an industrial cooling system. Each of these systems may be situated in a residential, commercial or industrial setting, or may be incorporated into a mobilized system for transportation.

Figure 6A:
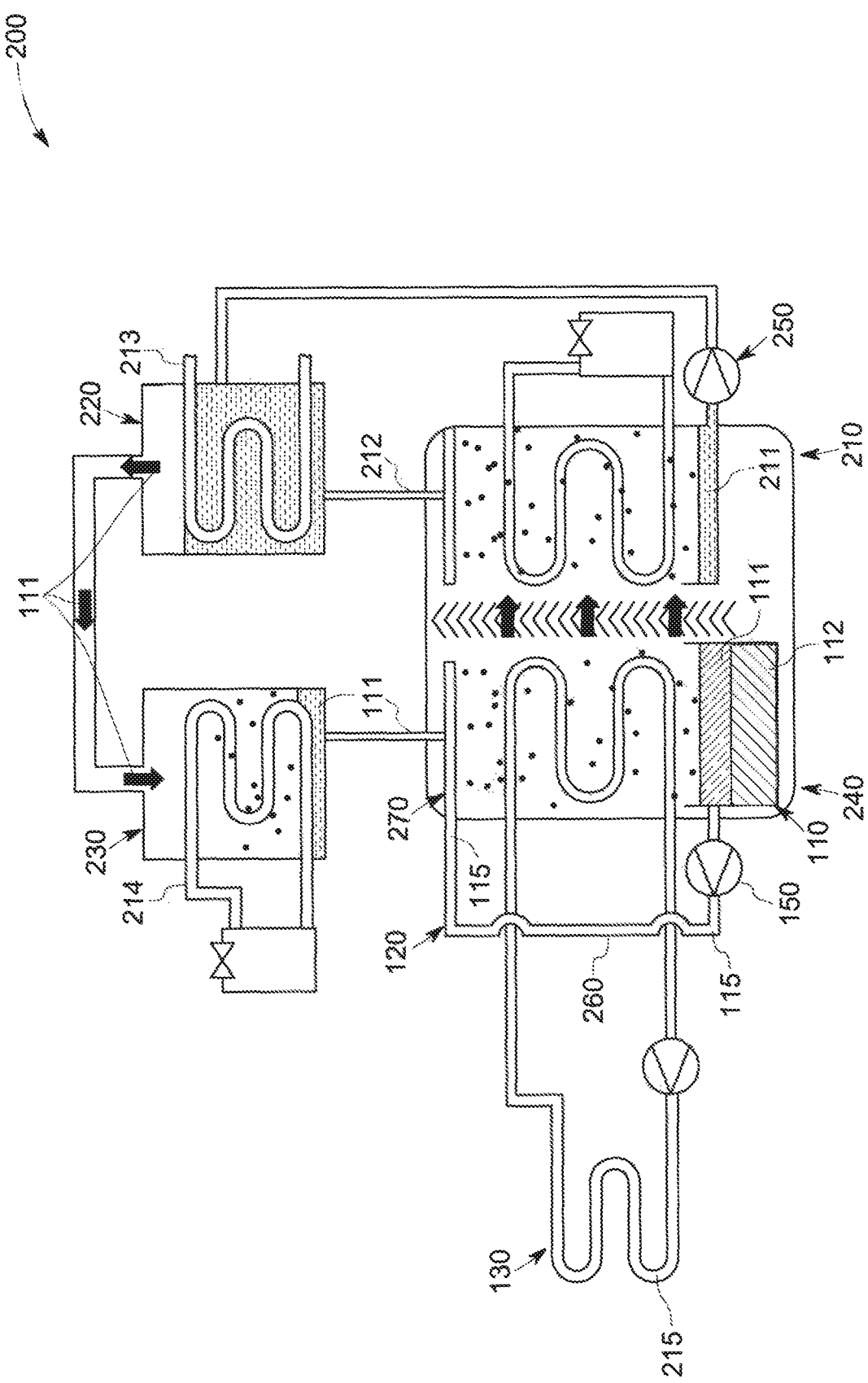
FIG. 6A illustrates an absorption cycle apparatus configuration when the operating temperature is greater than the LCST, in accordance with some embodiments of the disclosure.
Figure 6B:
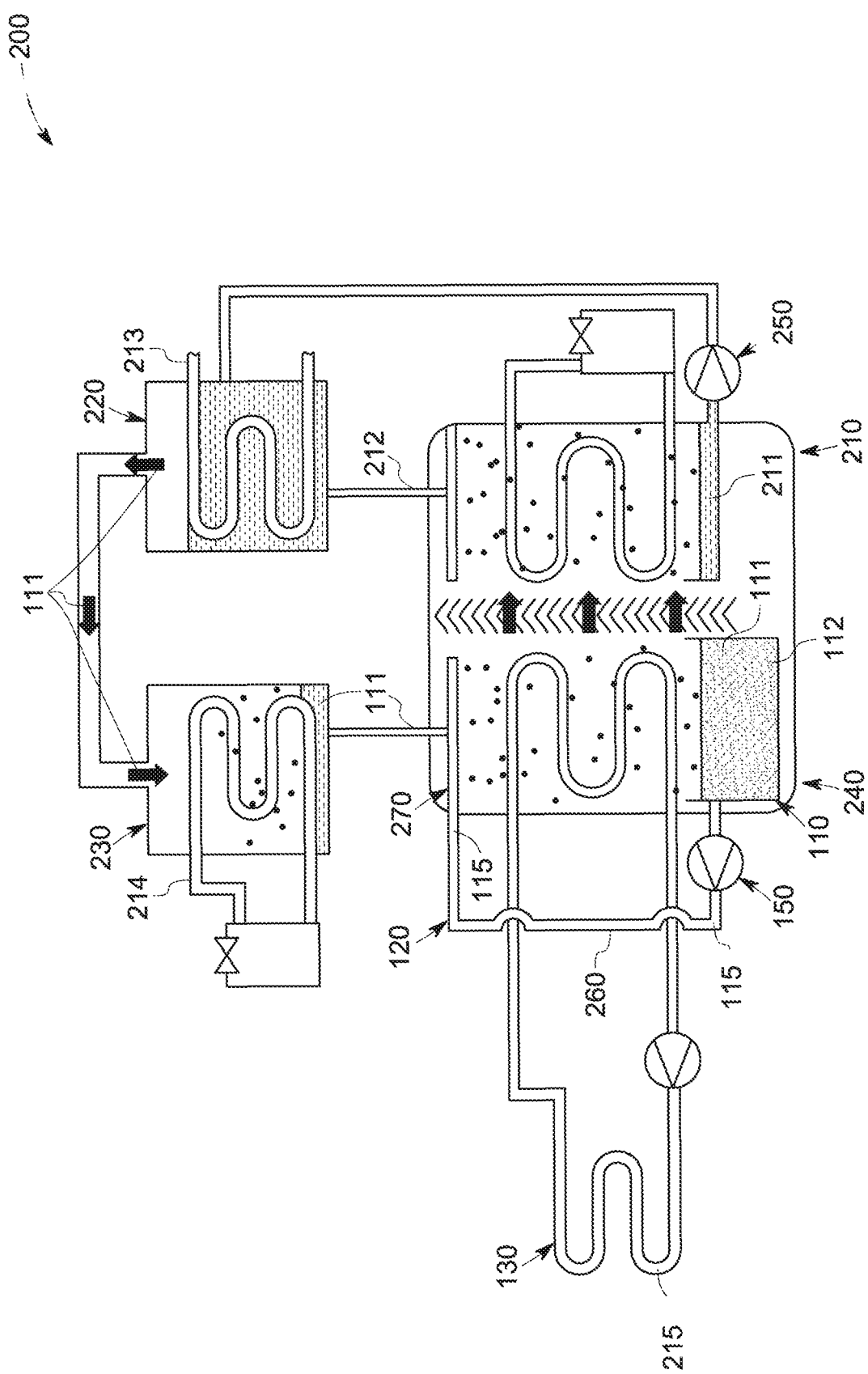
FIG. 6B illustrates an absorption cycle apparatus configuration when the operating temperature is lower than the LCST, in accordance with some embodiments of the disclosure.

In some embodiments, the cooling system may be employed for providing cooling in an absorption cycle apparatus. An absorption cycle apparatus is any apparatus or system that produces heating or cooling by use of a working fluid and the absorption effect as described herein. In one embodiment, the absorption cycle system includes an absorption chiller that produces cooling. A schematic diagram of an example absorption cooling system 200 is shown in FIGS. 6A and 6B. The system 200 includes an absorber 210, a generator 220, a condenser 230, and an evaporator 240.

The term "working fluid" as used herein refers to a fluid pair that can be used to provide the cooling or heating in an absorption cycle system. In typical absorption cycle systems, the working fluid includes a pair of fluids that have an affinity for one another, e.g., solubility of one in the other at a concentration and temperature. The fluids in the pair of fluids may be referred to as an absorbent and a refrigerant. The absorbent is the non-volatile component and the refrigerant is the volatile component. The refrigerant is capable of functioning as a heat transfer fluid by undergoing a phase change from a liquid phase to a gaseous phase, and back. In a typical absorption cycle apparatus, the absorbent may include a metal halide and the refrigerant may include water. Non-limiting examples of a suitable metal halide as absorbent includes a lithium halide, a calcium halide, or a combination thereof. In some embodiments, the metal halide includes lithium chloride, lithium bromide, calcium chloride, or combinations thereof.

Referring again to FIGS. 6A and 6B, in some embodiments, during operation of the absorption cycle apparatus 200, a refrigerant-rich working fluid 211 is present in the absorber 210. In some embodiments, the amount of refrigerant present in a refrigerant-rich working fluid is in a range from about 38 weight percent to about 45 weight percent. The refrigerant-rich working fluid may be transferred to the generator 220 via a pump 250, as shown in FIGS. 6A and 6B.

In some embodiments, the generator 220 may include a bundle of tubes that carry a heated fluid 213. The heated fluid 213 transfers heat into the refrigerant-rich working fluid 211 and thereby releases refrigerant vapor (e.g., water vapor) 111 into a condenser 230 and forms a refrigerant-lean working fluid 212. As will be appreciated by one of ordinary skill in the art, the refrigerant-lean working 212 fluid may still include some amount of refrigerant, however, the amount of refrigerant is lower than in the refrigerant-rich working fluid 211 that leaves the absorber. In some embodiments, the amount of refrigerant present in a refrigerant-lean working fluid 212 is in a range from about 34 weight percent to about 38 weight percent. The heated fluid 213 supplied to the generator 220 to release refrigerant vapor from the working fluid may be supplied by any number of sources, including combustion gases, water heated with waste heat from a combustion engine (combustion gases), solar-heated water, and steam, among others. The refrigerant-lean working fluid 212 is then transferred to the absorber 210 and collects in the bottom of the absorber, where it started the cycle.

A cooling fluid 214 may be provided to the condenser 230, such that the refrigerant vapor 111 condenses to form refrigerant liquid (e.g., water) 111. The refrigerant liquid 111 is transferred from the condenser 230 to the evaporator 240. In some embodiments, the refrigerant liquid may be optionally transported through an expansion device 270 that partially evaporates the refrigerant liquid, before transferring the refrigerant liquid to the evaporator 240. While the refrigerant fluid 111 is transported to the evaporator 240, a heat transfer fluid 215 may be simultaneously circulated through the evaporator 240 via a heat exchanger 130, as shown in FIGS. 6A and 6B. The heat transfer fluid 215 is cooled as the liquid refrigerant 111 is evaporated forming refrigerant vapor (e.g. water vapor). Non-limiting examples of a suitable heat transfer fluid 215, in this context, may include water, air or a combination thereof. The cooled heat transfer fluid may be circulated back to a system being cooled, thus providing the cooling effect as desired. After the heat transfer is effected, the refrigerant vapor is transferred from the evaporator 240 to the absorber 210. The high affinity of the absorbent for the refrigerant causes the refrigerant to be dissolved into the working fluid thereby forming the refrigerant-rich working fluid, which can start the cycle again.

In the embodiment illustrated in FIGS. 6A and 6B, the absorption cycle apparatus 200 may therefore function as a cooling system by absorbing heat from the heat transfer fluid 215 in the evaporator 240, and circulating the cooled heat transfer fluid to the system being cooled. In the embodiments illustrated in FIGS. 6A and 6B, the evaporator 240 further includes a reservoir 110 for circulating and replenishing the refrigerant stream 111 being evaporated in the evaporator 240 such that the desired cooling is achieved. However, as mentioned previously, if the operating temperature of the absorption cycle apparatus is lower than the freeze temperature of the refrigerant, the refrigerant may freeze in the evaporator thereby creating operational challenges.

Embodiments of the present disclosure address the noted limitations of typical absorption cycle apparatus. Referring again to FIGS. 6A and 6B, the evaporator 240 includes a reservoir 110 configured to selectively supply a cooling fluid 115. The evaporator 240 further includes a circulation loop 120 fluidly coupled to the reservoir 110, and configured to circulate the cooling fluid 115 to and from the reservoir 110, as illustrated in FIGS. 6A and 6B. The evaporator 240 furthermore includes a heat exchanger 130 thermally coupled to the circulation loop 120, and configured to exchange heat with the cooling fluid 115.

As illustrated in FIGS. 6A and 6B, the reservoir 110 includes a refrigerant 111 and an anti-freeze additive 112. Further as described in detail earlier, the anti-freeze additive 112 is characterized by a LCST such that when an operating temperature of the reservoir 110 is greater than the LCST, the reservoir 110 is configured to supply a cooling fluid 115 including the refrigerant to the circulation loop 120. Further, when the operating temperature of the reservoir 110 is lower than the LCST, the reservoir 110 is configured to supply a cooling fluid 115 including the refrigerant and the anti-freeze additive to the circulation loop 120. The term "operating temperature" as used in this context refers to the average temperature that the refrigerant in the reservoir is exposed to during operation of the evaporator. Further, the terms "operating" and "operation" as used herein encompass both the idle stages as well as the cooling stages of the evaporator 240.

FIGS. 6A and 6B illustrate reservoir configuration similar to the configurations illustrated in FIGS. 1A and 1B. However, alternate configurations of the reservoir 110 for the absorption cycle apparatus 200, as illustrated in FIGS. 3A, 3B, 4A, 4B, 5A, and 5B, are also envisaged within the scope of the present disclosure.

FIG. 6A illustrates an embodiment wherein the operating temperature of the reservoir 110 is greater than the LCST of the anti-freeze additive 112. As illustrated in FIG. 6A, when the operating temperature is greater than the LCST, the refrigerant 111 and the anti-freeze additive 112 in the reservoir 110 become immiscible, and are separated into two separate layers due to the density difference between the refrigerant and the anti-freeze additive. In such instances, when the operating temperature is greater than the LCST, the refrigerant enters and leaves the reservoir 110 from the inlet and the outlet, located above the interface line between the refrigerant 111 and the anti-freeze additive 112. Therefore, the anti-freeze additive 112 may not be substantially entrained by the refrigerant 111 flow, and substantially pure refrigerant may be supplied by the reservoir 110 to the circulation loop 120. Accordingly, the cooling fluid 115 discharged from the reservoir 110, as illustrated in FIG. 6A, includes the refrigerant primarily.

With continued reference to FIG. 6A, the cooling fluid 115 is circulated by the circulation loop 120 to the heat exchanger 130 where it may exchange heat, with the heat exchange fluid 215, thereby providing cooling for the desired application. The heated cooling fluid 115 is then circulated back to the reservoir 110, thereby completing the cycle. The circulation loop 120 in the embodiments illustrated in FIGS. 6A and 6B includes a conduit 260 for transferring the cooling fluid 115 from the reservoir 110 to a vaporizer 270. The refrigerant in the cooling fluid 115 is vaporized in the vaporizer 270 and at least a portion of it is returned to the reservoir 110 where it condenses again. Therefore, the circulation loop 120 in such embodiments, further includes the space defined between the evaporator 270 and the reservoir 110.

In the embodiments illustrated in FIG. 6A, as the operating temperature is greater than the LCST during the operation of the evaporator 240, the refrigerant 111 and the anti-freeze additive 112 remain substantially immiscible. Further, in such embodiments, the operating temperature of the reservoir 110 may be maintained such that the operating temperature is higher than the freeze temperature of the refrigerant. As mentioned earlier, a certain amount of refrigerant vapor in the evaporator is also transferred from the evaporator 240 the absorber 210, also illustrated in FIGS. 6A and 6B. The refrigerant vapor transferred to the absorber 210 may therefore include a portion of the vapor form of the refrigerant flow from the condenser 230 as well as the refrigerant flow from the reservoir 110 in the evaporator 240. Therefore, in some such embodiments, the amount of refrigerant circulated by the circulation loop, to and from the reservoir, may not be the same. Further, in some such embodiments, a portion of the refrigerant flow from the condenser 230 may also replenish the refrigerant content in the reservoir 110.

FIG. 6B illustrates an embodiment wherein the operating temperature of the reservoir 110 is lower than the LCST of the anti-freeze additive 112. As illustrated in FIG. 6B, when the operating temperature is lower than the LCST, the refrigerant 111 and the anti-freeze additive 112 in the reservoir 110 become miscible, and form a substantially homogeneous mixture. Accordingly, the cooling fluid 115 discharged from the reservoir 110, as illustrated in FIG. 6B, includes the refrigerant and the anti-freeze additive. As mentioned previously, the amount of anti-freeze additive 112 in the reservoir 110 is predetermined such that the desired shift of the freezing point of the refrigerant 111 can be achieved to avoid freezing damages.

With continued reference to FIG. 6B, the cooling fluid 115 (including the refrigerant and the anti-freeze additive) is circulated by the circulation loop 120 to the heat exchanger 130 where it may exchange heat with heat exchange fluid 215, thereby providing cooling for the desired application. The heated cooling fluid 115 is then circulated back to the reservoir 110, thereby completing the cycle. In the embodiments illustrated in FIG. 6B, as the operating temperature is lower than the LCST during the operation of the cooling system 100, the refrigerant 111 and the anti-freeze additive 112 remain substantially miscible. Therefore, the freeze temperature for the refrigerant in the evaporator 240 is lowered to a desired value during the operation of the evaporator 240.

Therefore, embodiments of the present disclosure advantageously relate to an absorption cycle apparatus 200 that automatically releases an anti-freeze additive along with a refrigerant, as and when required. The absorption cycle systems described herein may therefore mitigate the operational challenges faced by absorption cycle systems (e.g., absorption chillers) when the operating temperature is lower than the freeze temperature of the refrigerant. Further, the absorption cycle systems described herein may also mitigate the thermal conductivity challenges faced by conventional absorption cycle system employing a mixture of refrigerant and anti-freeze additive (e.g., glycols) as the cooling fluid.

Figure 7:
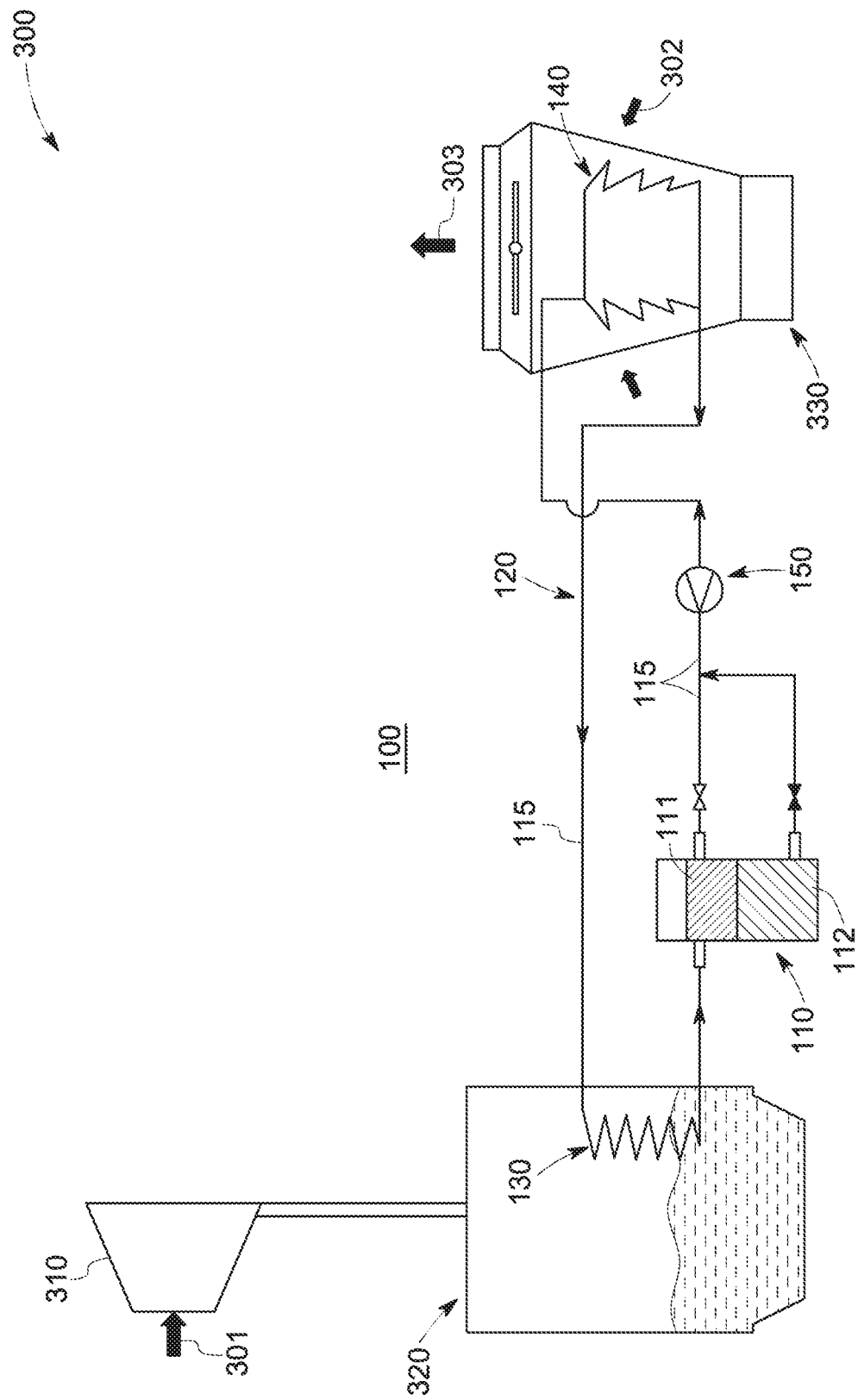
FIG. 7 illustrates an application of a cooling system, in accordance with some embodiments of the disclosure.
Figure 8:
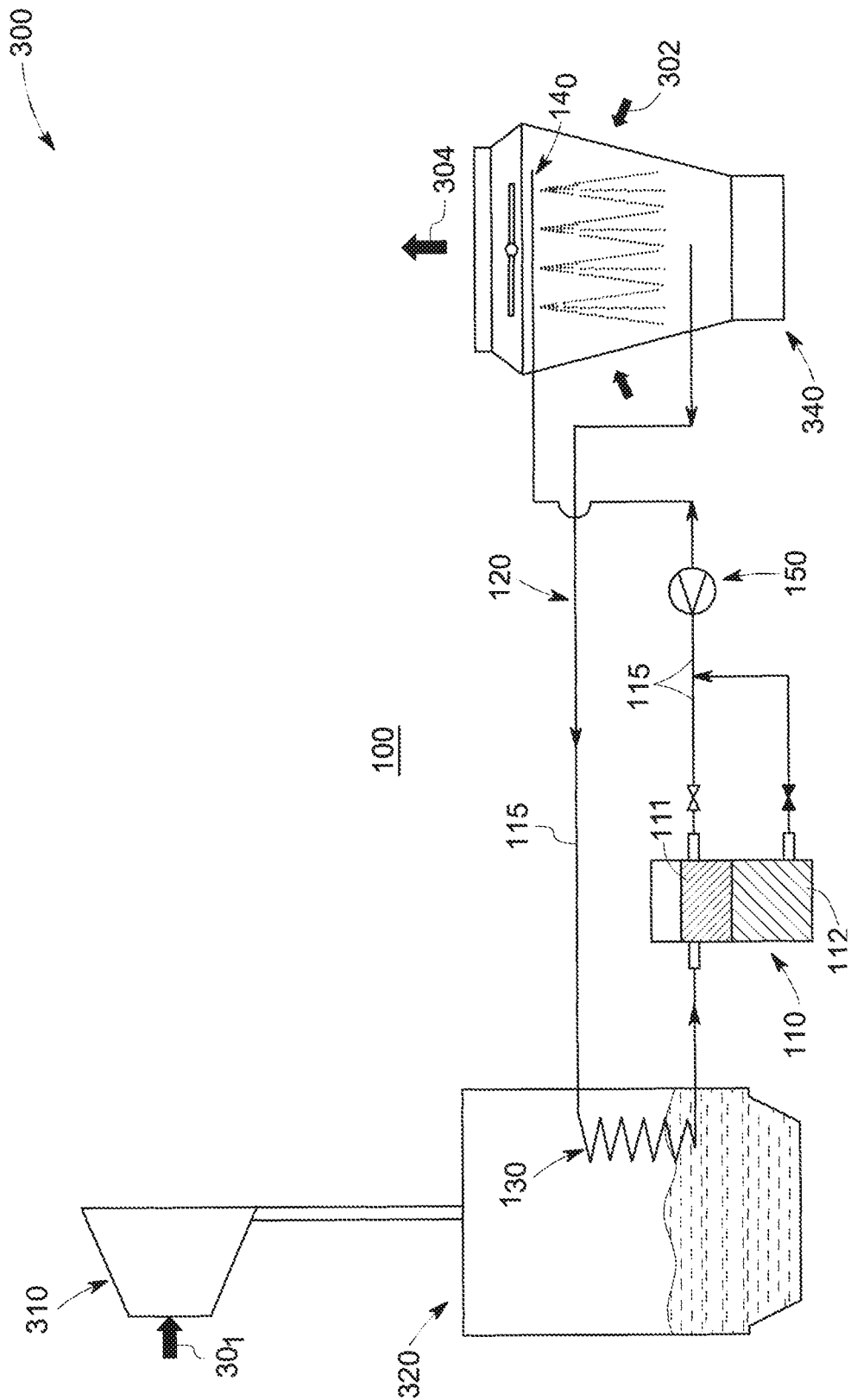
FIG. 8 illustrates an application of a cooling system, in accordance with some embodiments of the disclosure.
Figure 9:
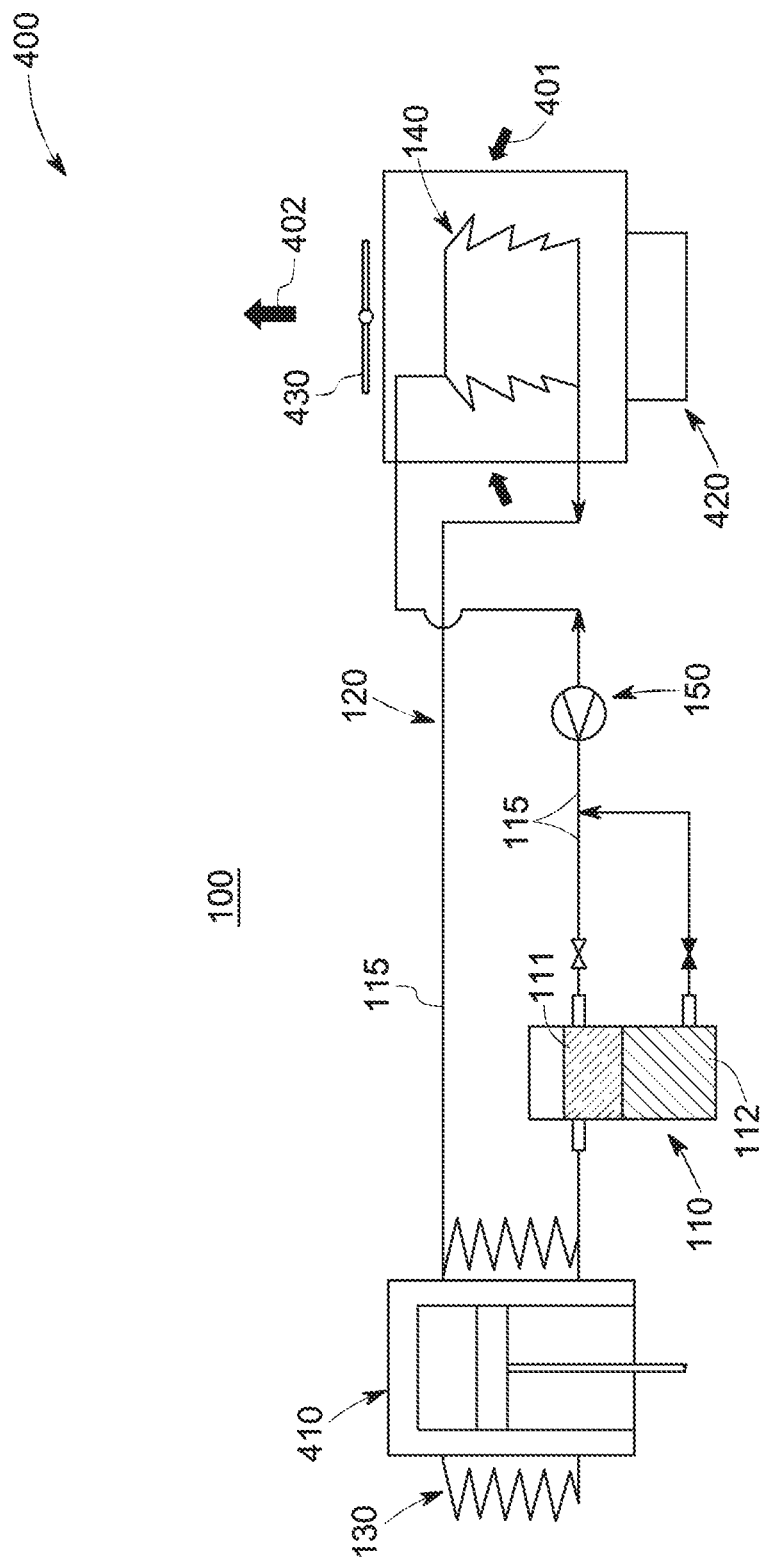
FIG. 9 illustrates an application of a cooling system, in accordance with some embodiments of the disclosure.

FIGS. 7-9 illustrate additional example applications of the cooling systems described in the present disclosure. FIG. 7 is a schematic illustration of a system 300 used for cooling a flow of steam 301, discharged from a high-pressure steam turbine or a boiler (not shown in Figures). The system further includes a low-pressure steam turbine 310 configured to receive the flow of steam 301 and a condenser 320 configured to receive the flow of steam from the low-pressure turbine 310. The system 300 further includes a cooling system 100, as described herein earlier. The heat exchanger 130 in the cooling system 100 is configured to exchange heat between the cooling fluid 115 and the flow of steam 301 in the condenser 320, thereby condensing steam to form water. The condensed water from the condenser 320 may be recirculated to the high-pressure steam turbine or boiler for further use. Further, as illustrated in FIG. 7, the heat rejection device 140 in the cooling system 100 maybe in thermal communication with a cooling tower 330, for example. The cooling tower 330 receives cold air 302 that exchanges heat via the heat rejection device 140 with the cooling fluid 115 in the circulation loop 120, to form warm air 303 that is released from the cooling tower 330. FIG. 8 is a schematic illustration of a system 300 used for cooling a flow of steam 301 similar to that of FIG. 7, with the exception that the cooling tower 330 of FIG. 7 is replaced with a wet cooling tower 340. In the embodiment illustrated in FIG. 8, the wet cooling tower 340 receives cold air 302 that exchanges heat with the cooling fluid 115 in the circulation loop 120 to form warm, moist air 304 that is released from the cooling tower, FIG. 9 is a schematic illustration of a system 400 used for cooling hot walls of an internal combustion engine 410. The system 400 further includes a cooling system 100, as described herein earlier. The heat exchanger 130 in the cooling system 100 is configured to exchange heat between the cooling fluid 115 and the hot walls of the internal combustion engine 410. Further, as illustrated in FIG. 9, the heat rejection device 140 in the cooling system 100 maybe in thermal communication with a radiator 420, for example. The radiator 420 receives cold air 401 that exchanges heat via the heat rejection device 140 with the cooling fluid 115 in the circulation loop 120, to form warm air 402 that is released from the radiator via a fan 430.

The appended claims are intended to claim the invention as broadly as it has been conceived and the examples herein presented are illustrative of selected embodiments from a manifold of all possible embodiments. Accordingly, it is the Applicants' intention that the appended claims are not to be limited by the choice of examples utilized to illustrate features of the present invention. As used in the claims, the word "comprises" and its grammatical variants logically also subtend and include phrases of varying and differing extent such as for example, but not limited thereto, "consisting essentially of" and "consisting of." Where necessary, ranges have been supplied; those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

What is claimed is:

1. A cooling system, comprising:
   a steam turbine;
   a condenser that receives a flow of steam from the steam turbine;
   an evaporator;
   a reservoir disposed in the evaporator and configured to selectively supply a cooling fluid, the reservoir including a first outlet disposed proximate a top end of the reservoir and a second outlet disposed proximate a bottom end of the reservoir, the first outlet fluidly coupled to a first outlet valve and the second outlet fluidly coupled to a second outlet valve, wherein the reservoir comprises a refrigerant and an anti-freeze additive, the anti-freeze additive characterized by a lower critical solution temperature (LCST), wherein the first outlet valve is configured to open and the second outlet valve is configured to close when a reservoir operating temperature is greater than the LCST, wherein the first outlet valve is configured to close and the second outlet valve is configured to open when the reservoir operating temperature is less than the LCST;

a circulation loop fluidly coupled to the reservoir, and configured to circulate the cooling fluid to and from the reservoir;

an agitator disposed within the reservoir and configured to mix the refrigerant and the anti-freeze additive when the reservoir operating temperature is less than the LCST, and wherein the agitator is configured to turn off when the reservoir operating temperature is greater the LCST; and a heat exchanger thermally coupled to the circulation loop and configured to exchange heat between the cooling fluid and the flow of steam in the condenser;

wherein when the reservoir operating temperature is greater than the LCST, the reservoir is configured to supply a first mixture of the cooling fluid comprising the refrigerant and less than 5 weight percent of the anti-freeze additive to the circulation loop; and when the reservoir operating temperature is lower than the LCST, the reservoir is configured to supply a second mixture of the cooling fluid comprising the refrigerant and between about 5 weight percent and about 60 weight percent of the anti-freeze additive to the circulation loop.

2. The cooling system of claim 1, wherein when the reservoir operating temperature is lower than the LCST, the refrigerant and the anti-freeze additive are present in the reservoir as a substantially miscible phase, and when the reservoir operating temperature is greater than the LCST, the refrigerant and the anti-freeze additive are present in the reservoir as substantially immiscible phases.

3. The cooling system of claim 1, wherein the LCST of the anti-freeze additive is in a range from about 1° C. to about 60° C.

4. The cooling system of claim 1, wherein the anti-freeze additive comprises amines, polyalkylene glycols, polyamines, ionic liquids, or combinations thereof.

5. The cooling system of claim 1, wherein the anti-freeze additive and the refrigerant have a density difference greater than 30 kg/m$^3$.

6. The cooling system of claim 1, wherein the reservoir is configured to supply the cooling fluid to the circulation loop via the first outlet.

7. The cooling system of claim 1, wherein the reservoir is configured to supply the cooling fluid to the circulation loop via the second outlet.

8. The cooling system of claim 1, wherein the reservoir is disposed directly downstream of the heat exchanger such that the reservoir is configured to receive a heated cooling fluid from the heat exchanger.

9. The cooling system of claim 1, wherein the circulation loop is configured to circulate a portion of the cooling fluid into the heat exchanger and a remaining portion of the cooling fluid is circulated directly into the reservoir.

10. The cooling system of claim 1, further comprising a heat rejection device thermally coupled to the circulation loop, the heat rejection device configured to cool the cooling fluid before the cooling fluid exchanges heat with the heat exchanger.

11. A method of cooling using a cooling system comprising a steam turbine, a condenser that receives a flow of steam from the steam turbine, an evaporator, a reservoir disposed in the evaporator, a circulation loop, and a heat exchanger, wherein the reservoir comprises a refrigerant and an anti-freeze additive, the anti-freeze additive characterized by a lower critical solution temperature (LCST), the method comprising:

selectively supplying a cooling fluid from the reservoir to the circulation loop, such that when a reservoir operating temperature is greater than the LCST, a first mixture of the cooling fluid comprising the refrigerant and less than 5 weight percent of the anti-freeze additive is supplied to the circulation loop; and when the reservoir operating temperature is lower than the LCST, a second mixture of the cooling fluid comprising the refrigerant and between about 5 weight percent and about 60 weight percent of the anti-freeze additive is supplied to the circulation loop;

operating an agitator disposed within the reservoir to mix the refrigerant and the anti-freeze additive when the reservoir operating temperature is less than the LCST and turning off the agitator when the reservoir operating temperature is greater the LCST;

circulating the cooling fluid via the circulation loop from the reservoir to the heat exchanger by opening one of a first outlet valve or a second outlet valve and leaving the other of the first outlet valve or the second outlet valve closed, the first outlet valve fluidly coupled to a first outlet that is disposed proximate to a top end of the reservoir, the second outlet valve fluidly coupled to a second outlet that is disposed proximate to a bottom end of the reservoir, wherein the first outlet valve is open and the second outlet valve is closed when the reservoir operating temperature is greater than the LCST, wherein the first outlet valve is closed and the second outlet valve is open when the reservoir operating temperature is less than the LCST, and wherein the cooling fluid exchanges heat with the flow of steam within the condenser via the heat exchanger; and circulating the cooling fluid from the heat exchanger to the reservoir via the circulation loop.

12. The method of claim 11, wherein when the reservoir operating temperature is lower than the LCST, the refrigerant and the anti-freeze additive are present in the reservoir as a substantially miscible phase, and when the reservoir operating temperature is greater than the LCST, the refrigerant and the anti-freeze additive are present in the reservoir as substantially immiscible phases.

13. An absorption cycle apparatus, comprising:
a steam turbine;
a condenser that receives a flow of steam from the steam turbine; and
an evaporator;
a reservoir disposed in the evaporator and configured to selectively supply a cooling fluid, the reservoir including a first outlet disposed proximate a top end of the reservoir and a second outlet disposed proximate a bottom end of the reservoir, the first outlet fluidly coupled to a first outlet valve and the second outlet fluidly coupled to a second outlet valve, wherein the reservoir comprises a refrigerant and an anti-freeze additive, the anti-freeze additive characterized by a lower critical solution temperature (LCST), wherein the first outlet valve is configured to open and the second outlet valve is configured to close when a reservoir operating temperature is greater than the LCST, wherein the first outlet valve is configured to close and the second outlet valve is configured to open when the reservoir operating temperature is less than the LCST;
a circulation loop fluidly coupled to the reservoir, and configured to circulate the cooling fluid to and from the reservoir;

an agitator disposed within the reservoir and configured to mix the refrigerant and the anti-freeze additive when the reservoir operating temperature is less than the LCST, and wherein the agitator is configured to turn off when the reservoir operating temperature is greater the LCST; and a heat exchanger thermally coupled to the circulation loop and configured to exchange heat between the cooling fluid and the flow of steam in the condenser;

wherein when the reservoir operating temperature is greater than the LCST, the reservoir is configured to supply a first mixture of the cooling fluid comprising the refrigerant and less than 5 weight percent of the anti-freeze additive to the circulation loop; and when the reservoir operating temperature is lower than the LCST, the reservoir is configured to supply a second mixture of the cooling fluid comprising the refrigerant and between about 5 weight percent and about 60 weight percent of the anti-freeze additive to the circulation loop; and an absorber in fluid communication with the evaporator.

14. The absorption cycle apparatus of claim 13, wherein the LCST of the anti-freeze additive is in a range from about 1° C. to about 60° C.

15. The cooling system of claim 1, wherein the heat exchanger is disposed within the condenser.

* * * * *